US008442961B2

(12) United States Patent
Ferri et al.

(10) Patent No.: US 8,442,961 B2
(45) Date of Patent: May 14, 2013

(54) METHOD, SYSTEM AND COMPUTER PROGRAMMING FOR MAINTAINING BOOKMARKS UP-TO DATE

(75) Inventors: Luca Ferri, Rome (IT); Luigi Massa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 12/480,871

(22) Filed: Jun. 9, 2009

(65) Prior Publication Data
US 2009/0307221 A1    Dec. 10, 2009

(30) Foreign Application Priority Data
Jun. 10, 2008  (EP) ..................................... 08157944

(51) Int. Cl.
*G06F 17/30*    (2006.01)
(52) U.S. Cl.
USPC .......................................... 707/694; 707/695
(58) Field of Classification Search .................. 707/694, 707/695
See application file for complete search history.

(56) References Cited

U.S. PATENT DOCUMENTS

| 5,813,007 A * | 9/1998 | Nielsen ................................. 1/1 |
| 2003/0184582 A1* | 10/2003 | Cohen ........................... 345/736 |
| 2005/0114756 A1* | 5/2005 | Lehikoinen et al. ........ 715/501.1 |

* cited by examiner

*Primary Examiner* — Baoquoc To

(57) ABSTRACT

A solution is proposed for facilitating accessing resources of a data processing system with distributed architecture by a data processing entity of the system (with each resource that is accessible via a corresponding address). A set of bookmarks are provided for corresponding resources. Each bookmark is associated with a stored address of the corresponding resource—for accessing the corresponding resource in response to a selection of the bookmark. In the solution according to an embodiment of the invention, a signature identifying the corresponding resource is associated with each bookmark. Each bookmark is updated by verifying accessibility of the resource at the stored address matches the signature. The resource matching the signature is then located via a search engine in response to the non-accessibility of the resource. It is then possible to replace the stored address with a new address of the located resource.

12 Claims, 8 Drawing Sheets

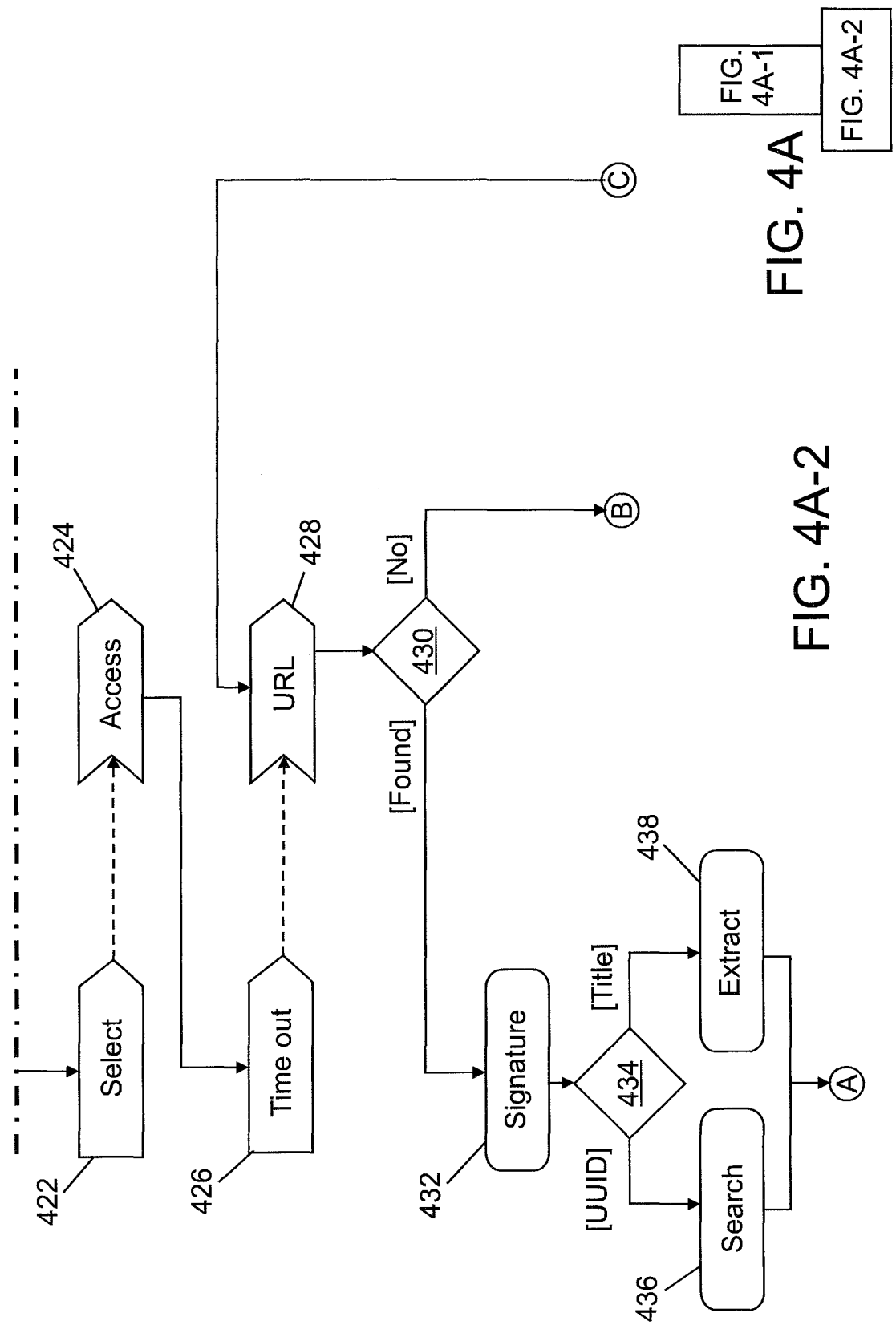

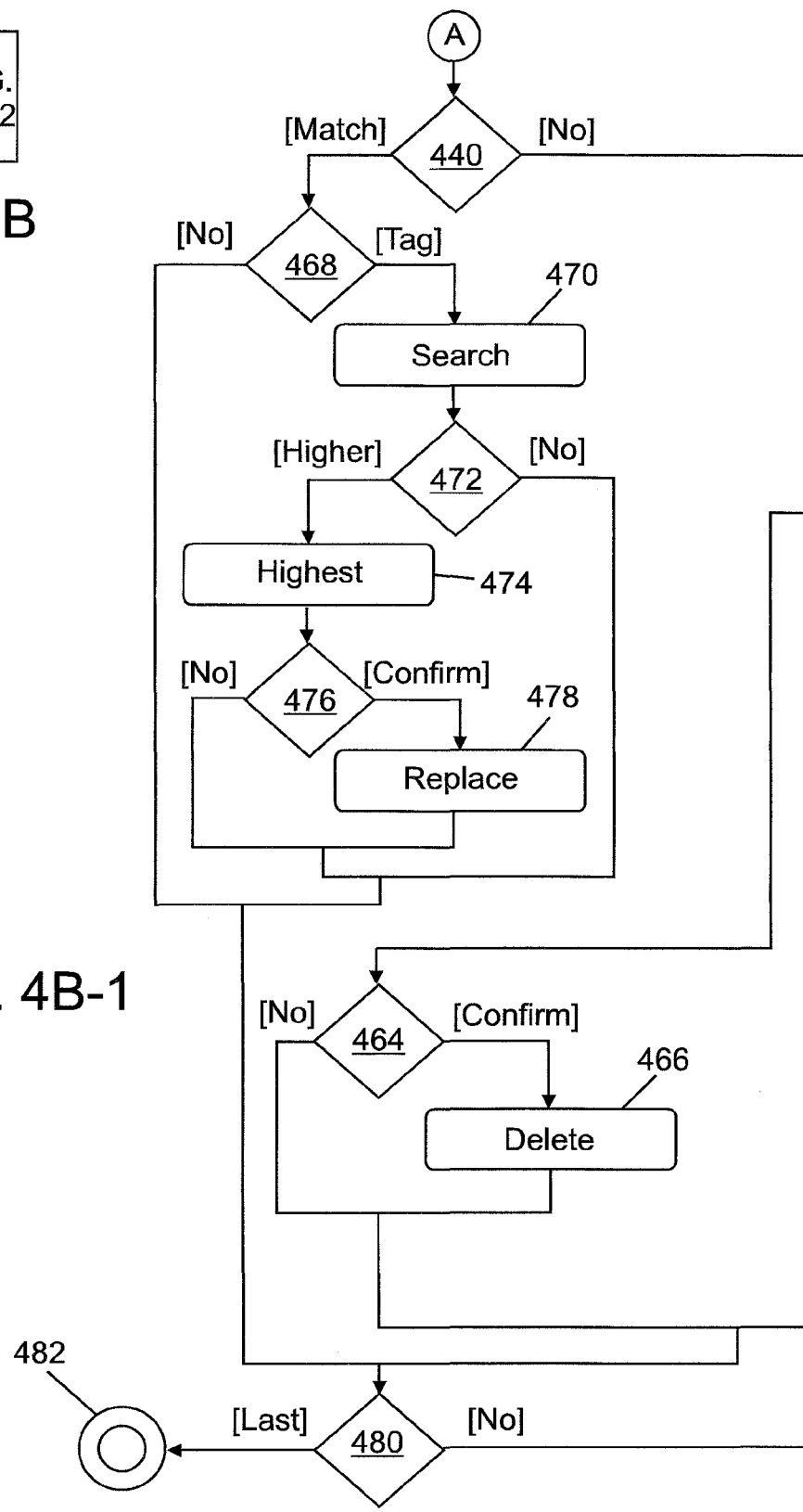

METHOD, SYSTEM AND COMPUTER PROGRAMMING FOR MAINTAINING BOOKMARKS UP-TO DATE

TECHNICAL FIELD

The solution according to an embodiment of the present invention relates to the information technology field. Particularly, this solution relates to the access to resources in a data processing system.

BACKGROUND

Modern data processing systems include a myriad of different resources. A typical example is the Internet, wherein a plethora of web sites (each one including a collection of web pages) are available to provide substantially every kind of information.

However, the task of identifying the web pages that fit specific needs is decidedly nontrivial. For this purpose, search engines are commonly used. Particularly, for each contingent need, a user enters a corresponding query (defined by one or more keywords) into a web page of a selected search engine. In response thereto, the search engine returns a list of web pages that best match the query (according to internal search criteria). Commonly, the search engine assigns a rank to each retrieved web page, so as to order the retrieved web pages according to their (estimated) relevance. The user then has to identify the web pages that are actually of interest (since many web pages may match the same keywords, but in a completely different context). It is then necessary for the user to select the web pages that are the most useful in the specific situation. This is generally based on a trial and error approach, wherein the search is incrementally refined until web pages that provide the required information (with an acceptable level of confidence) are found. However, the whole process is tedious and time consuming.

In order to alleviate this problem, all web browsers that are used to surf through the Internet allow users to create bookmarks for the web pages of most interest (which have been found with the above-mentioned process or suggested by others). Each bookmark stores a link to a corresponding web page, which is identified by a mnemonic description. In this way, the user can access known web pages by simply selecting their bookmarks.

However, the highly dynamic nature of the Internet complicates the management of the bookmarks. Indeed, the web pages change continually over time. For example, web pages may be moved to different locations (for example, when a corresponding web site is reorganized). Moreover, new versions of web pages may be provided (at different locations) with additional functionality. Conversely, web pages may be deleted when they are no longer supported. Moreover, the web pages may also change their content completely; for example, this happens when a corresponding domain name is allowed to lapse and it is then re-registered by someone else.

In any case, it is possible that some bookmarks will be associated with links that are not valid any longer (because they point either to deleted web pages or to different web pages). Therefore, when the user selects one of these bookmarks, s/he receives an error message (if the web page does not exist) or downloads an invalid web page (if it is different from the expected one). In this case, the user has to search again for the desired web page (by repeating the above-described process). This is quite frustrating for the user (since it involves an unforeseen waste of time, which may occur just when the corresponding information is needed urgently).

Moreover, the user generally becomes aware that a particular bookmark is not up-to-date a long time after its creation. Therefore, the user may not remember the search strategy that was used to find the corresponding web page; and as a result, the identification of the corresponding web page may be even more difficult.

SUMMARY

In its general terms, the solution according to an embodiment of the present invention is based on the idea of maintaining up-to-date the bookmarks.

More specifically, different aspects of the solution according to an embodiment of the invention are set out in the independent claims. Advantageous features of the same solution are set out in the dependent claims.

For example, an aspect of the solution according to an embodiment of the invention provides a method for facilitating accessing resources of a data processing system with distributed architecture by a data processing entity of the system (with each resource that is accessible via a corresponding address), wherein the resources are web pages that are accessed in the Internet by client computers. The method starts with the step of providing a set of bookmarks for corresponding resources. Each bookmark is associated with a stored address of the corresponding resource (for example, its Uniform Resource Locator, or URL)—so as to allow accessing the corresponding resource in response to a selection of the bookmark. In the solution according to an embodiment of the invention, the method further comprises associating a signature identifying the corresponding resource with each bookmark. For example, the signature may comprise a Universal Unique Identifier (UUID) that is included in a definition of the web page, or the signature may comprise a title of the web page. The method continues by updating each bookmark (for example, periodically). For this purpose, accessibility of the resource is verified via the resource at the stored address matching the signature. The resource matching the signature is then located via a search engine in response to the non-accessibility of the resource. It is then possible to replace the stored address with a new address of the located resource.

Another aspect of the solution according to an embodiment of the invention provides a computer program for performing the above-described method.

A further aspect of the solution according to an embodiment of the invention provides a corresponding system.

BRIEF DESCRIPTION OF THE DRAWINGS

The solution according to an embodiment of the invention, as well as further features and the advantages thereof, will be best understood with reference to the following detailed description, given purely by way of a non-restrictive indication, to be read in conjunction with the accompanying drawings, in which.

DETAILED DESCRIPTION

Figure 1:
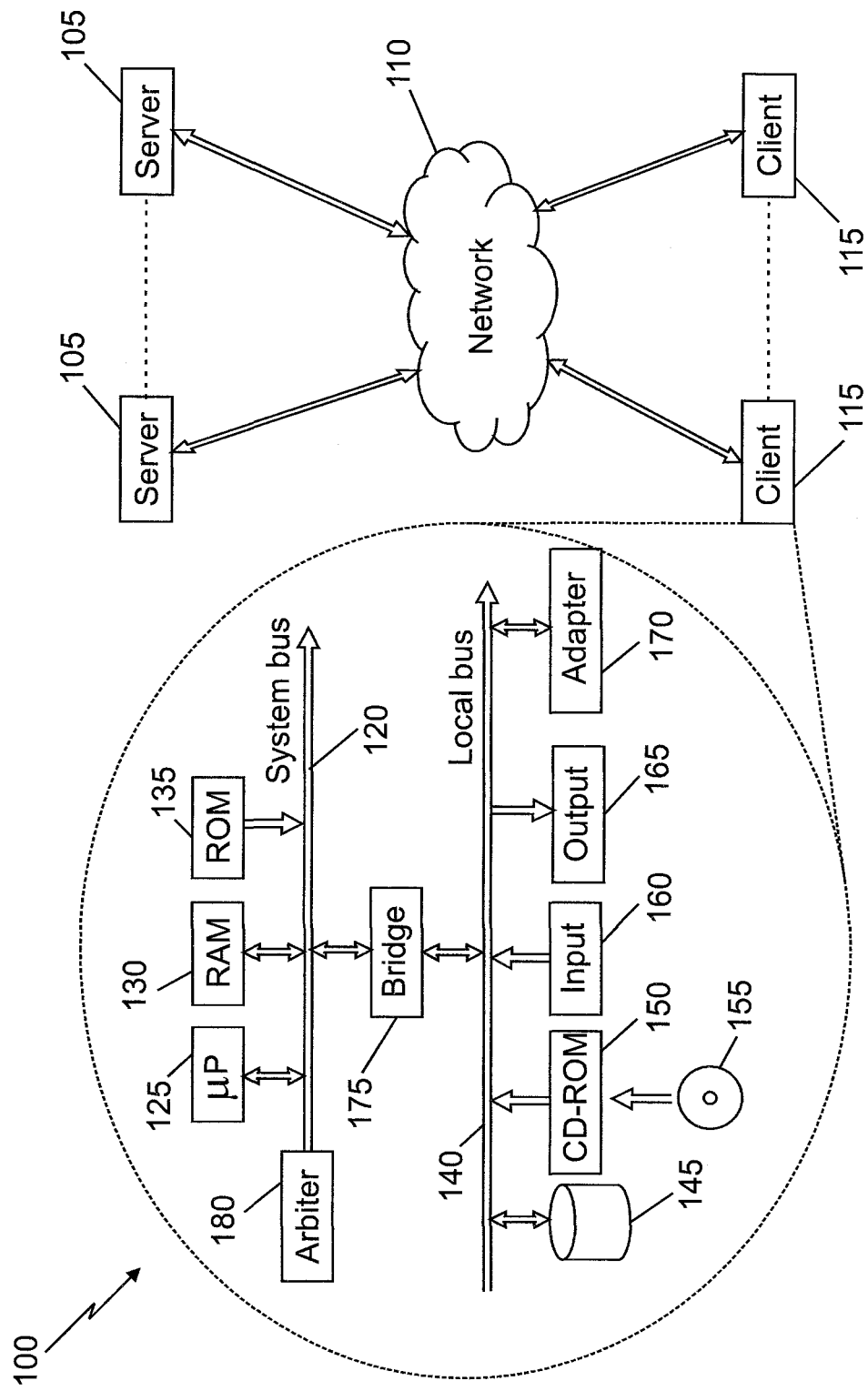
FIG. 1 is a schematic block diagram of a data processing system in which the solution according to an embodiment of the invention is applicable.

With reference in particular to FIG. 1, there is provided a schematic block diagram of a data processing system 100 in which the solution according to an embodiment of the invention is applicable. The system 100 has a distributed architecture, typically based on the Internet; the Internet is formed by millions of server computers (or simply servers) 105, which are connected to each other through a global communication network 110. A subset of the servers 110, known as World Wide Web or simply web, allows accessing corresponding web sites; each web site consists of a collection of web pages (connected to each other through corresponding hyper-links). Each web page is defined by a hypertext document (formatted in the HTML language), which document is accessed through the HTTP protocol. For this purpose, the web page is identified and localized by means of a corresponding URL, which consists of a string formatted according to a standard syntax. Users of client computers (or simply clients) 115 access the Internet (through computers that operate as access providers, not shown in the figure), in order to download desired web pages from the servers 105.

A generic client 115 is formed by several units that are connected in parallel to a system bus 120. In detail, one or more microprocessors (μP) 125 control operation of the client 115; a RAM 130 is directly used as a working memory by the microprocessors 125, and a ROM 135 stores basic code for a bootstrap of the client 115. Several peripheral units are clustered around a local bus 140 (by means of respective interfaces). Particularly, a mass memory consists of a hard-disk 145, and a drive 150 for reading DVD- or CD-ROMs 155. Moreover, the client 115 includes input units 160 (for example, a keyboard and a mouse), and output units 165 (for example, a monitor and a printer). An adapter 170 is used to connect the client 115 to the network 110. A bridge unit 175 interfaces the system bus 120 with the local bus 140. Each microprocessor 125 and the bridge unit 175 can operate as master agents requesting an access to the system bus 120 for transmitting information. An arbiter 180 manages the granting of the access with mutual exclusion to the system bus 120.

An example of application of the solution according to an embodiment of the invention is illustrated in FIGS. 2A-2E.

Figure 2A:
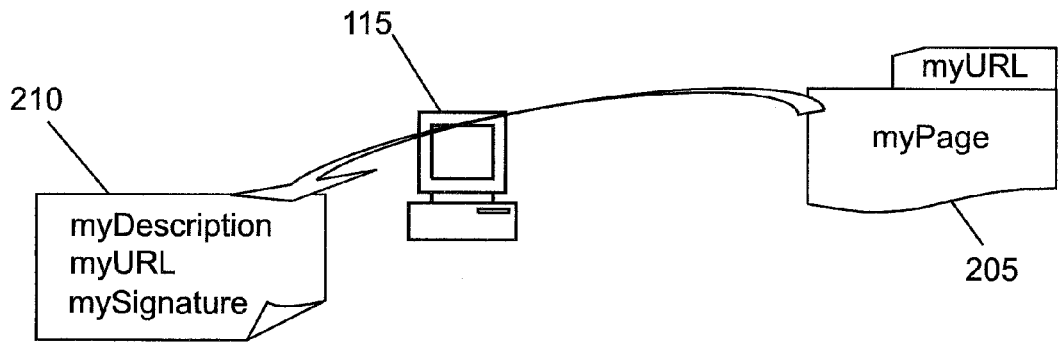
FIGS. 2A-2E illustrate an example of application of the solution according to an embodiment of the invention.

Starting from FIG. 2A, a user of a generic client 115 accesses a specific web page 205 ("myPage") at a corresponding URL ("myURL"). When the user deems that the web page 205 may be useful later on, s/he creates a corresponding bookmark 210 (also know as shortcut or favorite). The bookmark includes a mnemonic description ("myDescription") of the content of the web page 205. The bookmark 210 then associates this mnemonic description with the URL "myURL" of the page 205. In the solution according to an embodiment of the invention, as described in detail in the following, the bookmark 210 also includes a signature ("mySignature") of the web page 205; the signature is any information that may be used to identify the web page 205 (for example, a corresponding unique identifier).

Figure 2B:
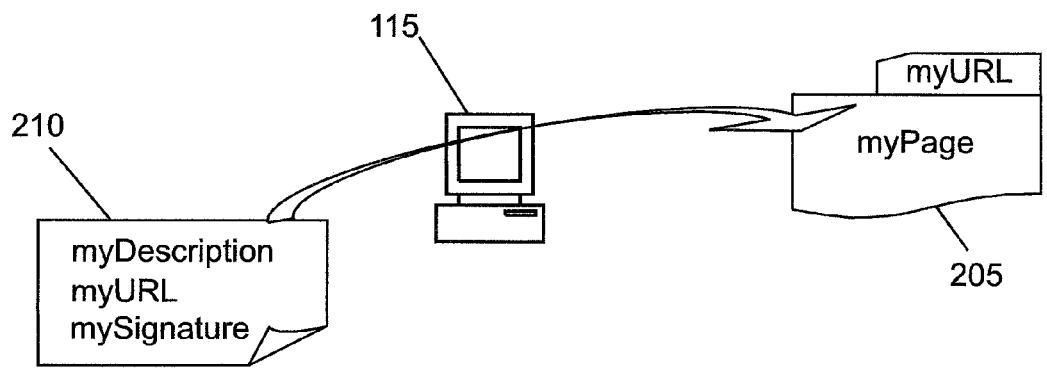

Moving to FIG. 2B, later on, the user selects the bookmark 210. In response thereto, the (stored) URL "myURL" is retrieved; the stored URL "myURL" is then used to access the corresponding web page 205 directly.

Figure 2C:
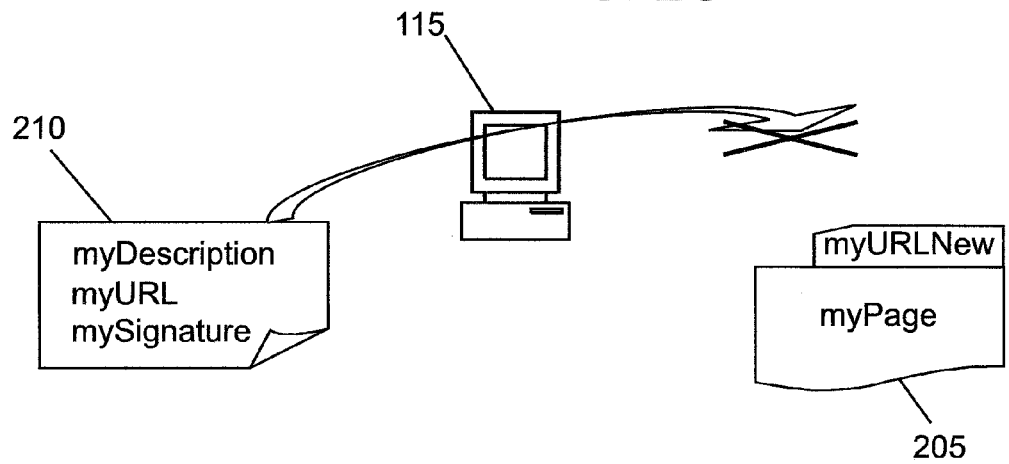

However, as shown in FIG. 2C, the web page 210 may be moved to a different URL ("myURLNew"). In this case, if the user selects the bookmark 210, no web page can be found at the stored URL "myURL".

Figure 2D:
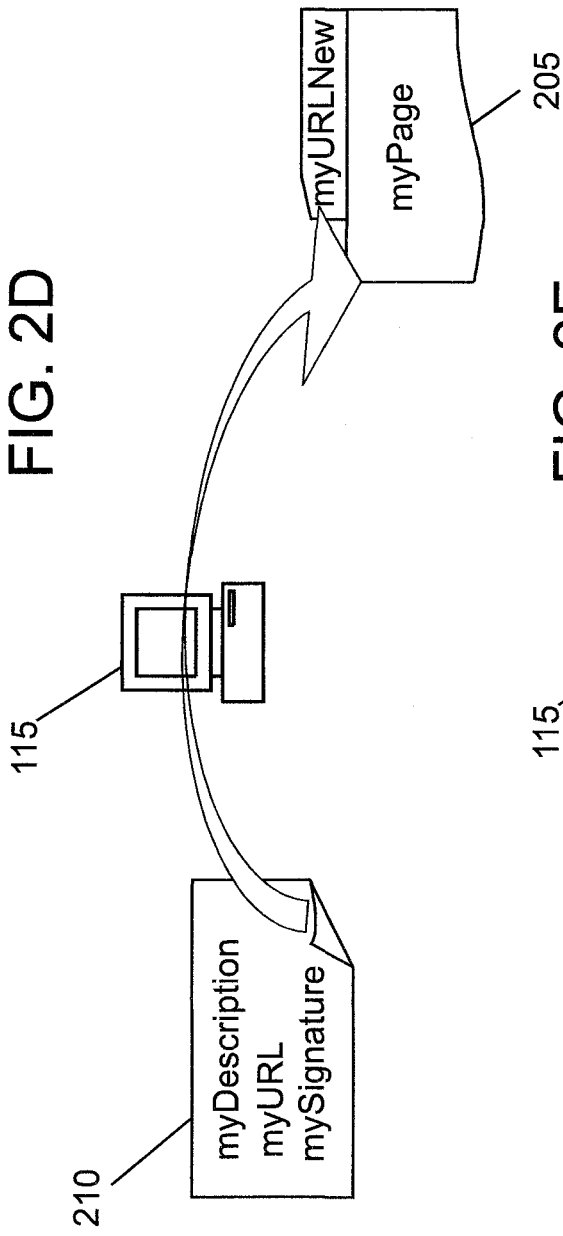

Considering now FIG. 2D, in the solution according to an embodiment of the invention (as described in detail in the following) the bookmark 210 is updated automatically (for example, by running a live-update process in the background periodically). For this purpose, the client 115 locates the web page 210 in the Internet by means of its signature "mySignature" (for example, by exploiting standard search engines).

Figure 2E:
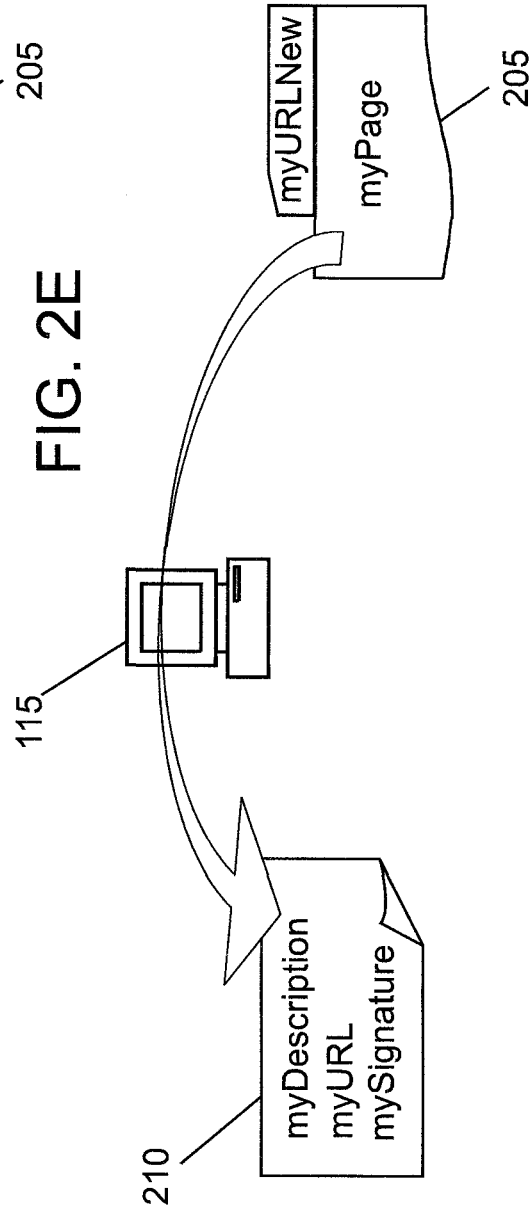

Moving to FIG. 2E, the URL "myURLNew" of the web page 205 so identified (i.e., the valid one) is then substituted for the stored URL "myURL" (i.e., the invalid one) in the bookmark 210.

The proposed solution facilitates the management of the bookmarks (especially in the highly dynamic environment of the Internet). As a result, it is possible to avoid (at least in most practical situations) having the bookmarks store URLs that are not valid any longer; this generally prevents the user from receiving error messages or downloading invalid web pages. All of the above strongly improves the usability of the Internet.

Figure 3:
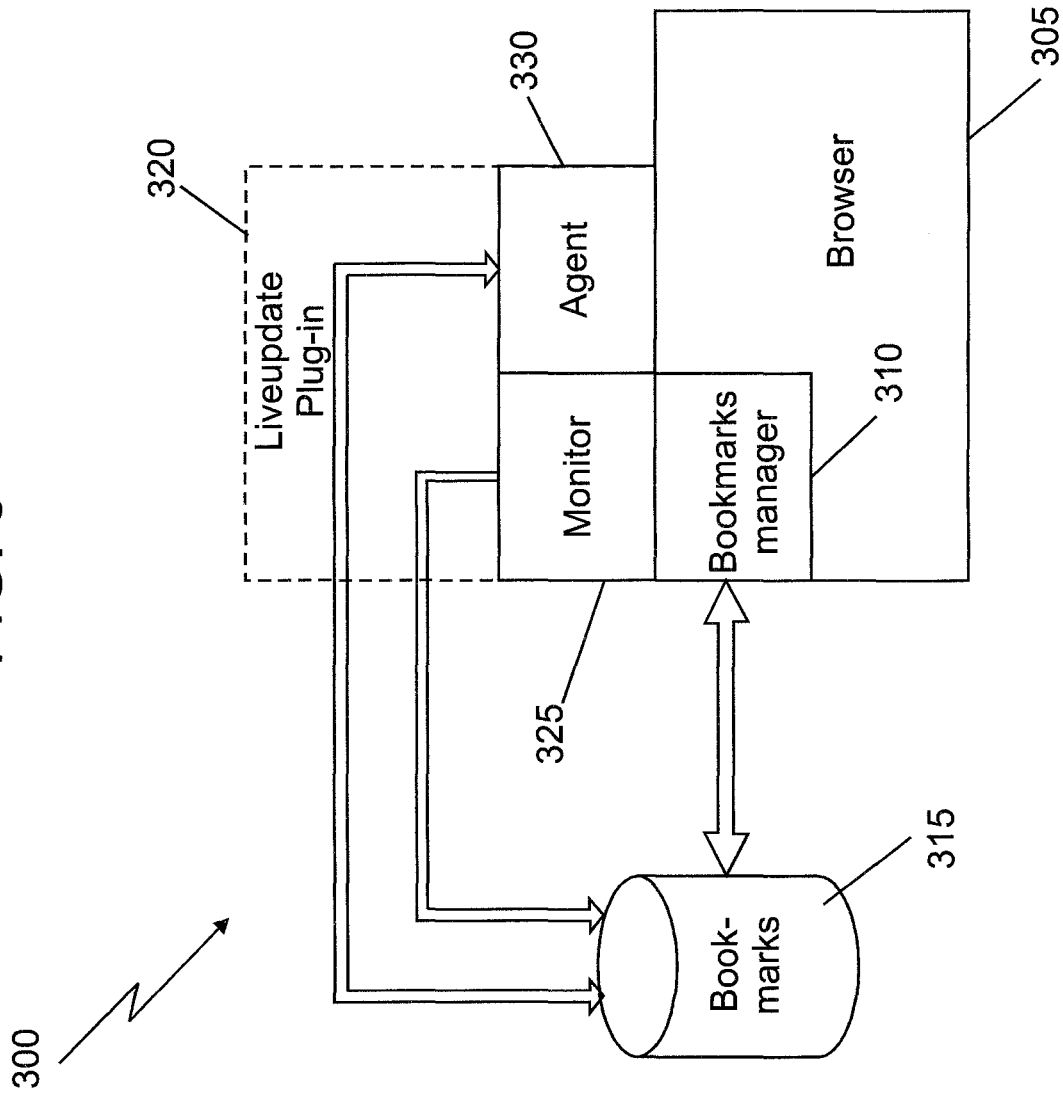
FIG. 3 depicts the main software components that can be used to practice the solution according to an embodiment of the invention.

With reference now to FIG. 3, the main software components that may be used to practice the solution according to an embodiment of the invention on a generic client are denoted as a whole with the reference 300.

A standard browser 305 is used to surf through the Internet. Particularly, the browser 305 makes it possible to locate desired web pages (through the corresponding URLs), and then download them on the client for their display. Moreover, the browser 305 allows the user of the client to move quickly to other web pages (in the same web site or in a different one) by means of corresponding hyper-links.

The browser 305 includes a built-in bookmark manager 310, which is used to control a repository 315 of bookmarks. For example, the bookmark repository 315 may comprise a single file with a predefined name, a distinct file for each bookmark in a predefined folder, a dedicated database, or the like. The bookmarks may be organized in any way to catalogue the corresponding web pages (for example, by using a folder metaphor).

A live-update plug-in 320 extends the functionality of the browser 305 to implement the above-described solution. Particularly, a monitor 325 detects any update of the bookmarks repository 315 (under the control of the bookmarks manager 310), which update involves the addition of a new bookmark for a currently displayed web page. In response thereto, the monitor 325 extracts the signature of this web page from its definition (already loaded by the browser 305), and adds it to the new bookmark. An agent 330 running in the background is in charge of maintaining the bookmark repository 315 up-to-date. For this purpose, the agent 330 interfaces with the browser 305 (to search the desired web pages) and with the monitor 325 (to extract the signatures of the retrieved web pages).

Figures 1, 4A:
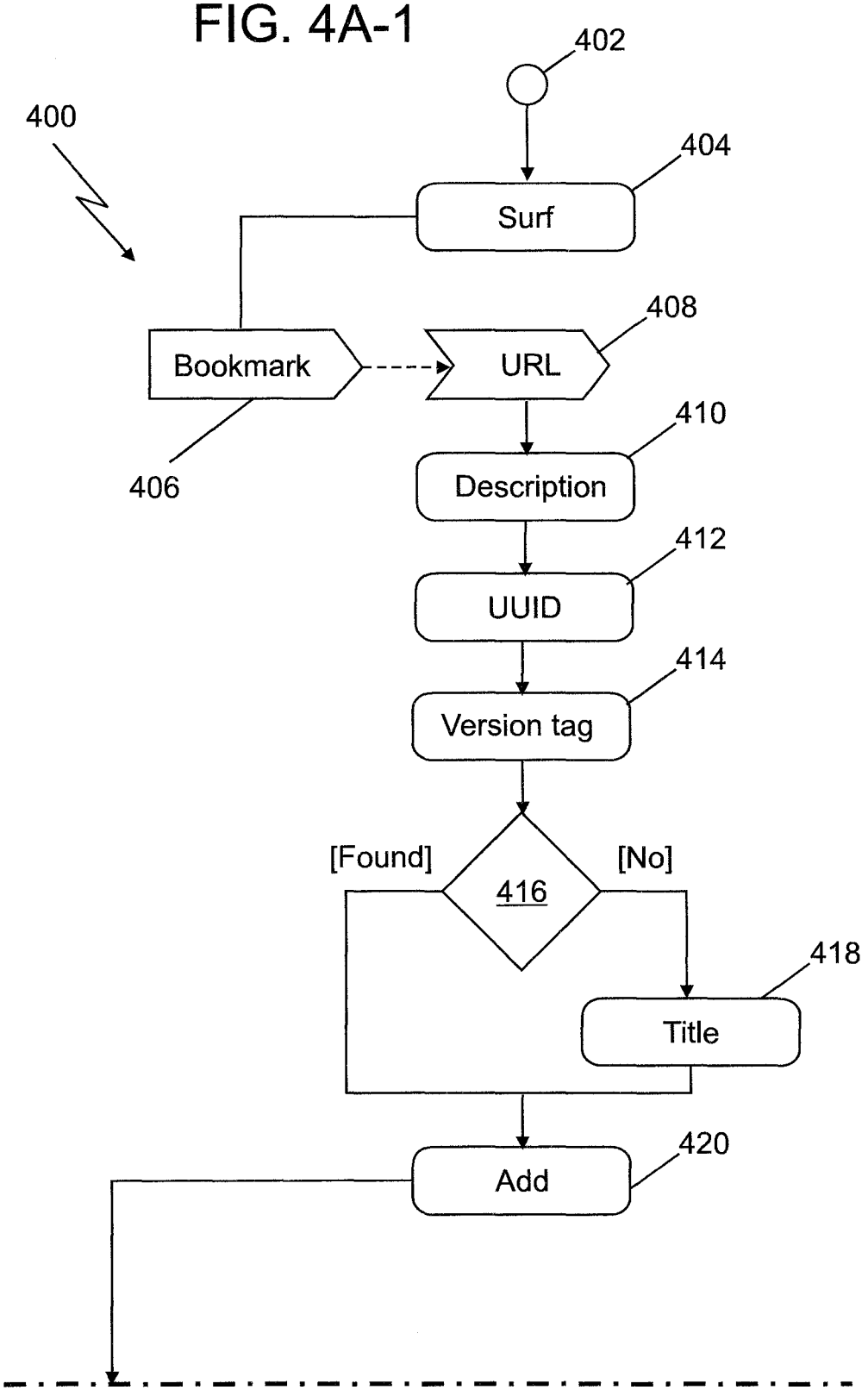
FIGS. 4A-4B illustrate a diagram describing the flow of activities relating to an implementation of the solution according to an embodiment of the invention.
Figures 2, 4B:
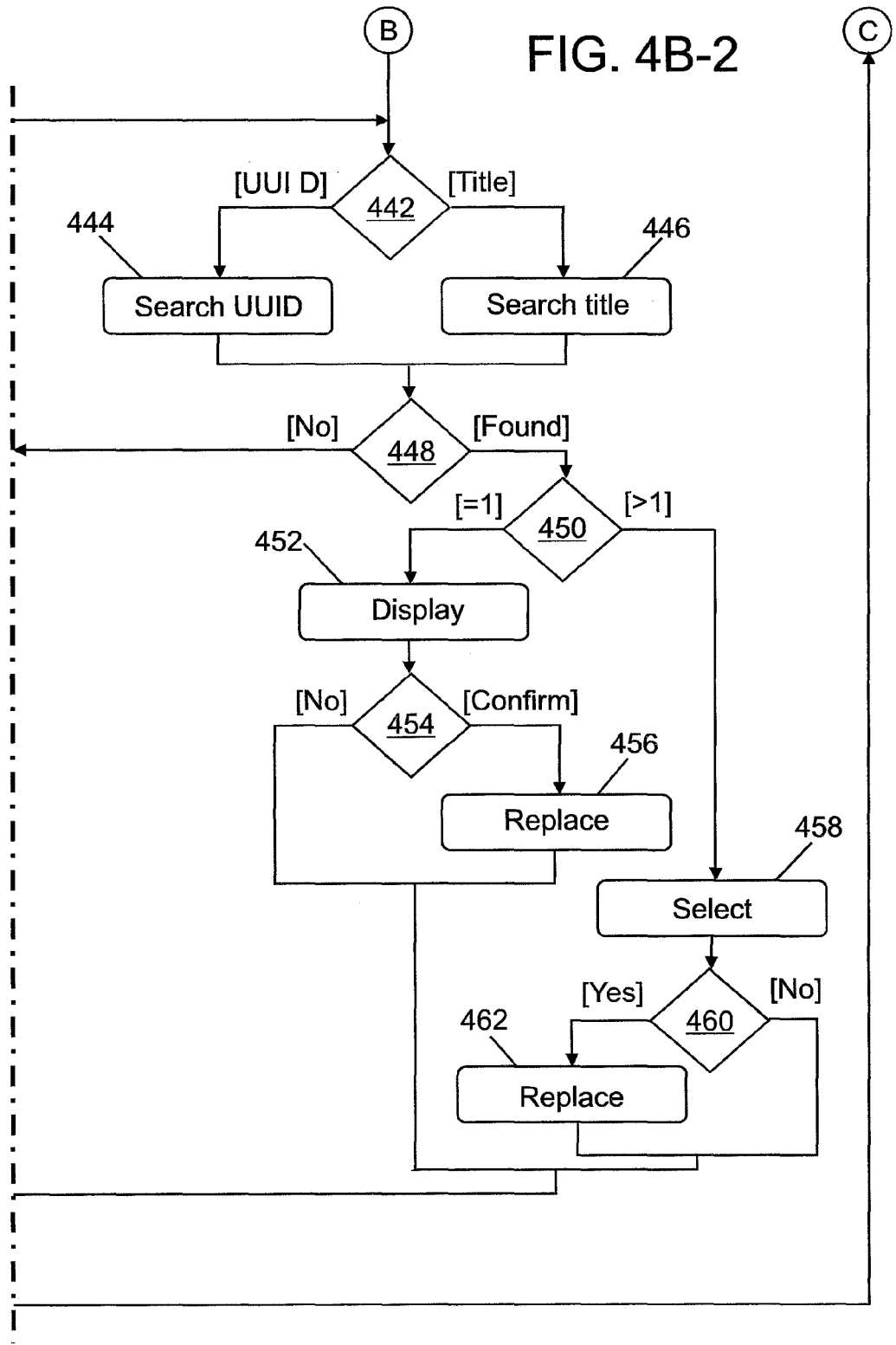

A diagram describing the flow of activities relating to an implementation of the solution according to an embodiment of the invention is illustrated in FIGS. 4A-4B. Particularly, the logic flow of an exemplary process that can be implemented on a generic client to maintain the bookmarks up-to-date is represented with a method 400.

The method begins at the black start circle 402, and then passes to block 404 where the user of the client surfs through the Internet in order to access any desired web page. When the user deems that a currently displayed web page may be useful later on, s/he creates a corresponding bookmark at block 406 (for example, by selecting a dedicated command in a menu bar of the browser).

For this purpose, the URL of this web page is determined at block 408 (being already available in the browser). Passing to block 410, the user is prompted to enter a mnemonic description of the web page (by default, set to a predefined number of characters of its title).

Considering now block 412, a UUID of the web page is searched in the web page's definition. The UUID consists of a number that is generated so as to ensure its uniqueness in the Internet (for example, a 128-bit number obtained by combining an address of the server that published the web page, a timestamp of its publication, and a random component). The UUID of the web page ("myUUID") may be found in different positions; for example, the UUID is inserted in a title element (between the tags <title> and </title>), in a keyword section (as a metadata defined by a corresponding element <meta name="keywords" content="myUUID">), or in a comment element (between the tags <!- and -->). The signature of the web page is then set equal to its UUID, if available (so as to ensure that the web page is uniquely identified in the Internet). Continuing to block 414, a version tag of the web page is likewise searched in its definition. The version tag consists of a value (for example, an 8-bit number) that indicates a current version of the web page (wherein the lower the version tag the older the version, starting from 0 or none for its first version). The version tag may be appended at the end of the UUID (separated by a period). For example, when a web page is published for the first time, it may be identified by the value "myUUID" or "myUUID.0"; when the same web page is re-published in amended form later on, it is then identified as "myUUID.1", "myUUID.2", and so on.

A test is now made at block 416 to verify whether the UUID of the web page has been found. If not, the method continues to block 418, wherein the title of the web page is extracted from its definition. The signature of the web page is then set equal to its title. This allows exploiting the proposed solution even when the web page has not been specifically instrumented for this purpose (with the inclusion of its UUID). The process then descends into block 420; the same point is also reached directly from block 416 when the UUID has been found in the web page, in which case, the signature is set equal to the UUID.

Considering now block 420, a new bookmark is created and added to the corresponding repository. The new bookmark associates the mnemonic description of the web page with its URL, signature, and version tag (if available).

Subsequently, when the user wishes to access a specific web page, s/he selects the corresponding bookmark (as identified by its mnemonic description) at block 422. In response thereto, at block 424 the (stored) URL associated with the selected bookmark is retrieved, and the web page at the stored URL is accessed (if still available).

As soon as a predefined time-out expires at block 426 (for example, every week); a loop is performed for updating each bookmark included in the corresponding repository (starting from the first one). The loop begins at block 428, wherein the stored URL of the (current) bookmark is retrieved, and an attempt is then performed to access the web page at the stored URL. A test is now made at block 430 to verify whether a web page has been found at the stored URL. If so, then the signature associated with the bookmark is retrieved at block 432. The flow of activity then branches at block 434 according to the type of signature (i.e., UUID or title) that has been stored—for example, as indicated by a corresponding flag that is set at the creation of the bookmark. If the signature consists of a UUID, then this value is searched at block 436 in the definition of the accessed web page (as above, in the title element, in the keyword section and/or in the comment elements). Conversely, the method at block 438 extracts the title of the accessed web page and verifies whether it is equal to the signature.

In both cases, the flow of activity merges at block 440. If the accessed web page does not match the signature (i.e., it does not include the UUID or it does not have the same title), then the method continues to block 442. The same point is also reached directly from block 430 when no web page has been found at the stored URL (as indicated by a corresponding error message—such as "error 404"). The blocks 442-466 are then executed. Referring back to block 440, if the accessed web page instead matches the signature, then the blocks 468-478 are executed. In both cases, the flow of activity then continues to block 480.

With reference now to block 442 (URL not found or no web page matching the signature), the flow of activity again branches according to the type of signature (i.e., UUID or title). If the signature consists of a UUID, then the web pages including this value in their definition (i.e., in the title element, in the keyword section and/or in the comment elements) are searched for at block 444 by accessing one or more predefined search engines. In this way, it is possible to support the most common approaches that are used by the different search engines. Conversely, the web pages having their title equal to the signature are searched for at block 446 (by means of the same search engines).

In both cases, a result of the search is verified at block 448. If one or more web pages matching the signature have been found, the flow of activity continues to block 450, wherein it branches according to the number of found web pages. When a single web page has been found, this web page is downloaded and displayed on the client at block 452. The user is then prompted at block 454 to confirm whether this web page is actually the one corresponding to the bookmark. If so, then the method continues to block 456, wherein the URL of the accessed web page (already available in the browser) is used to replace the stored URL of the bookmark. The method now passes to block 480. The same point is also reached directly from block 454 when the user does not confirm the replacement of the stored URL (so that the bookmark remains unchanged). Conversely, when multiple web pages have been found (block 450), a brief description of these web pages is displayed at block 458, with the possibility of downloading each one of them for its display. Typically, this happens when the signature is defined by a title (since it is quite likely to be replicated in the Internet). The user is then prompted at block 460 to select one of the found web pages (actually corresponding to the bookmark). If the user makes a selection, then the method continues to block 462, wherein the URL of the selected web page (already available in the browser) is used to replace the stored URL of the bookmark. The method then passes to block 480. The same point is also reached directly from block 460 when the user does not select any web page (so that the bookmark again remains unchanged).

Returning back to block 448, if no web page matching the signature has been found, then the flow of activity continues to block 464. In this phase, the user is prompted to confirm whether the bookmark has to be deleted (since it is not possible to associate it with the desired web page any longer). If so, then the bookmark is removed from the corresponding repository at block 466. The method then passes to block 480. The same point is also reached directly from block 464 when the user does not confirm the deletion of the bookmark.

With reference instead to block 468 (web page matching the signature), a test is made to verify whether a (stored) version tag is included in the bookmark. If so, then the method continues to block 470. In this phase, a search is made for all the web pages including the UUID of the bookmark in their definitions. Each result of the search is verified at block 472 by comparing the version tag to the version tag of the bookmark. If one or more web pages have been found with their version tags that are higher than the stored version tag (meaning that more recent versions of the same web page are available), then the method descends into block 474. In this phase, the found web page with the highest version tag (i.e., the most recent one) is selected. The user is then prompted at block 476 to confirm the replacement of the (older) web page corresponding to the bookmark with its most recent version. If so, then the method continues to block 478, wherein the URL of the selected web page (already available in the browser) is used to replace the stored URL of the bookmark. The method then passes to block 480. The same point is also reached directly from block 468 (when no version tag is included in the bookmark), from block 472 (when no web page is found with a higher version tag), or from 476 (when the user does not confirm the replacement of the stored URL). This additional feature ensures that the bookmark always points to the most recent version of the corresponding web page.

With reference now to block 480, a test is made to determine whether the last bookmark of the repository has been processed. If not, then the method returns to block 428 to repeat the same operations on a next bookmark. Conversely (once all the bookmarks have been verified and possibly updated), the loop is exited, descending into the concentric white/black stop circles 482.

Naturally, in order to satisfy local and specific requirements; a person skilled in the art may apply to the solution described above many logical and/or physical modifications and alterations. More specifically, although the solution according to an embodiment of the invention has been described with a certain degree of particularity with reference to preferred embodiment(s) thereof, it should be understood that various omissions, substitutions and changes in the form and details as well as other embodiments are possible within the scope of the invention. Particularly, the same solution may be practiced without the specific details (such as the numerical examples) set forth in the preceding description to provide a more thorough understanding thereof. Also, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

Particularly, the proposed solution lends itself to being implemented with an equivalent method (by using similar steps, removing some steps being non-essential, or adding further optional steps); moreover, the steps may be performed in a different order, concurrently or in an interleaved way (at least in part).

Similar considerations apply if the bookmarks are managed in a different way (for example, they are shared in a community); moreover, the bookmarks may store additional and/or different information (for example, addresses of a local network, macros to perform login procedures, and the like). Also, a completely silent process (wherein the bookmarks are updated automatically without requiring any confirmation by the user) may be implemented within the scope of the invention.

Even though in the preceding description reference has been specifically made to web pages; this is not to be interpreted in a limiting manner. Indeed, the same concepts are also applicable to pages defined in any other markup language, to different types of documents, to software applications, to network nodes, or more generally to any (logical and/or physical) resources of a data processing system in the broadest meaning of the term.

alternatively, an equivalent unique identifier may be used to define the signature of each web page—for example, a Globally Unique Identifier (GUID), or any other value whose probability of replication is acceptable in practice.

Likewise, the UUID may be searched in any other position (even in the whole definition of the web page).

Moreover, nothing prevents setting the signature to a value that is obtained by processing the title of the web page according to whatsoever algorithms a user chooses (for example, a hash thereof).

In any case, it is possible to use any other value suitable to identify the web page for defining the respective signature (for example, based on its whole definition).

The possibility of selecting the web page whose URL is to be used to replace the stored URL of the bookmark automatically (for example, according to some sort of ranking) is not excluded.

In a different implementation, the bookmarks may be deleted automatically when no web page matching the associated signature is found after a predefined number of attempts over time (for example, after 2-3 runs of the process of updating the bookmarks)—so as to avoid deleting bookmarks by mistake when the non-accessibility of the corresponding web pages is simply due to transient problems.

Similar considerations apply to the management of the version tags. However, this feature is not strictly necessary, and it may be omitted in a simplified implementation of the proposed solution.

Alternatively, the process of updating the bookmarks may be launched with a different frequency (for example, every day), or asynchronously when the client is idle; in any case, nothing prevents performing the same operations at runtime whenever any bookmark is selected.

Similar considerations apply if the program (which may be used to implement each embodiment of the invention) is structured in a different way, or if additional modules or functions are provided. Likewise, the memory structures may be of other types, or may be replaced with equivalent entities. In any case, the program may take any form suitable to be used by any data processing system or in connection therewith (for example, within a virtual machine); particularly, the program may be in the form of external or resident software, firmware, or microcode (either in object code or in source code—for example, to be compiled or interpreted). Moreover, it is possible to provide the program on any computer-usable medium; the medium can be any element suitable to contain, store, communicate, or transfer the program. For example, the medium may be of the electronic, magnetic, optical, electromagnetic, infrared, or semiconductor type. Examples of such medium are fixed disks (where the program can be pre-loaded), removable disks, tapes, cards, networks, and the like. In any case, the solution according to an embodiment of the present invention lends itself to be implemented even with a hardware structure (for example, integrated in a chip of semiconductor material), or with a combination of software and hardware.

The proposed solution may be deployed as a stand-alone application, as a plug-in for a browser (or any equivalent program), or even directly in the browser itself.

The proposed method may also be carried out on a system with a different architecture or including equivalent units (for example, based on a local network). Moreover, the same solution may be applied on a server (storing shared bookmarks). In any case, each computer may have another structure or may include similar elements (such as cache memories temporarily storing the programs or parts thereof). It is also possible to replace the computer with any code execution entity (such as a PDA, a mobile phone, and the like), or with a combination of multiple entities (such as a multi-tier architecture, a grid computing infrastructure, and the like).

What is claimed is:

1. A method for facilitating accessing resources of as data processing system with distributed architecture by a data processing entity of the system, each resource being accessible via a corresponding address, wherein the method comprises the steps of:
   providing a set of bookmarks for corresponding resources, each bookmark being associated with a stored address of the corresponding resource for accessing the corresponding resource in response to a selection of the bookmark,
   associating a signature identifying the corresponding resource with each bookmark, and
   updating each bookmark by performing the steps of:
      verifying accessibility of the resource via the resource at the stored address matching the signature,
      locating the resource matching the signature via a search engine in response to non-accessibility of the resource, and
      replacing the stored address with a new address of the located resource.

2. The method according to claim 1, wherein the resources are pages, each page having a definition written in a markup language.

3. The method according to claim 2, wherein the step of associating a signature identifying the corresponding resource with each bookmark comprises:
   extracting a unique identifier of the page from the corresponding definition, the signature being set to the unique identifier.

4. The method according to claim 3, wherein the step of verifying accessibility of the resource via, the resource at the stored address matching the signature comprises:
   verifying an inclusion of the unique identifier of the signature in the definition of a page accessed via the stored address,
   and wherein the step of locating the resource matching the signature via a search engine comprises:
      searching for a page including the unique identifier of the signature in the corresponding definition.

5. The method according to claim 2, wherein the step of associating a signature identifying the corresponding resource with each bookmark comprises:
   extracting a title of the page from the corresponding definition, the signature being set according to the title.

6. The method according to claim 5, wherein the step of verifying accessibility of the resource via the resource at the stored address matching the signature comprises:
   verifying an inclusion of the title of the signature in the definition of a page accessed via the stored address,
   and wherein the step of locating the resource matching the signature via a search engine comprises:
      searching for a page including the title of the signature in the corresponding definition.

7. The method according to claim 1, wherein the step of locating the resource matching the signature via a search engine comprises, in response to the location of a plurality of resources matching the signature:
   prompting a user to select one of the located resources.

8. The method according to claim 1, wherein the step of updating each bookmark further comprises:
   deleting the bookmark in response to locating no resource matching the signature.

9. The method according to claim 1, further including the step of:
   associating a stored tag indicative of a version of the corresponding resource with each bookmark,
   the step of updating each bookmark further including:
      searching more recent resources matching the signature, each more recent resource including a tag indicative of a more recent version than the stored tag, and
      replacing the stored address with a new address of one of the more recent resources whose tag is indicative of the most recent version.

10. The method according to claim 1, further including the step of:
    triggering an execution of the step of updating each bookmark periodically.

11. A computer program product comprising a computer-readable storage device having encoded thereon program instructions for facilitating accessing resources of the system by the entity, each resource being, accessible via a corresponding address, wherein the program instructions comprise:
    program instructions for providing a set of bookmarks for corresponding resources, each bookmark being associated with a stored address of the corresponding resource for accessing the corresponding resource in response to a selection of the bookmark,
    program instructions for associating a signature identifying the corresponding resource with each bookmark, and
    program instructions for updating each bookmark by performing the steps of:
       verifying accessibility of the resource via the resource at the stored address matching the signature,
       locating the resource matching the signature via a search engine in response to the non-accessibility of the resource, and
       replacing the stored address with a new address of the located resource.

12. A resource accessing system for facilitating, accessing resources of a data processing system with distributed architecture by a data processing entity of the system, each resource being accessible via a corresponding address, the system comprising:
    at least one processor;
    at least one memory operably connected to the at least one processor;
    a program of instruction encoded on the at least one memory and executed by the at least one processor, the program of instruction comprising:
    program instructions for providing a set of bookmarks for corresponding resources, each bookmark being associated with a stored address of the corresponding resource for accessing the corresponding resource in response to a selection of the bookmark, and
    program instructions for associating a signature identifying the corresponding resource with each bookmark, and
    program instructions for updating each bookmark by performing the steps of:
       verifying accessibility of the resource via the resource at the stored address matching the signature,
       locating the resource matching the signature via a search engine in response to the non-accessibility of the resource, and
       replacing the stored address with a new address of the located resource.

* * * * *